May 9, 1933. C. M. ELLENBERGER 1,907,525
FENDERWELL LOCK
Filed June 20, 1931
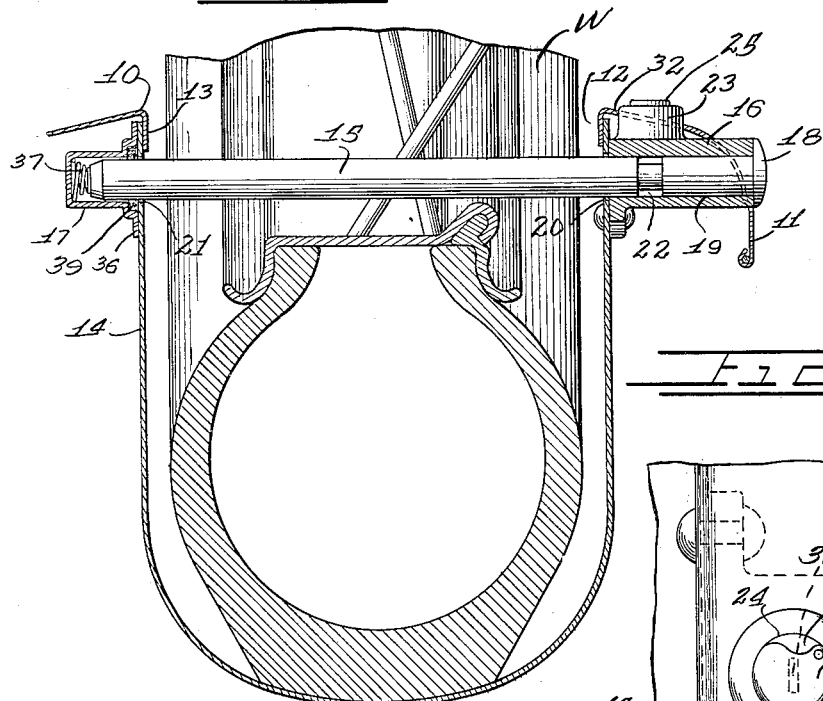
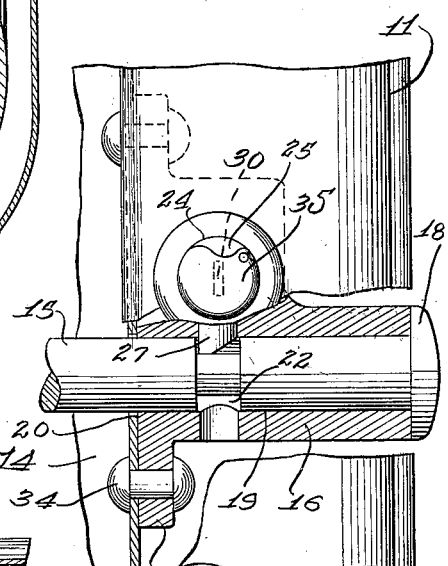
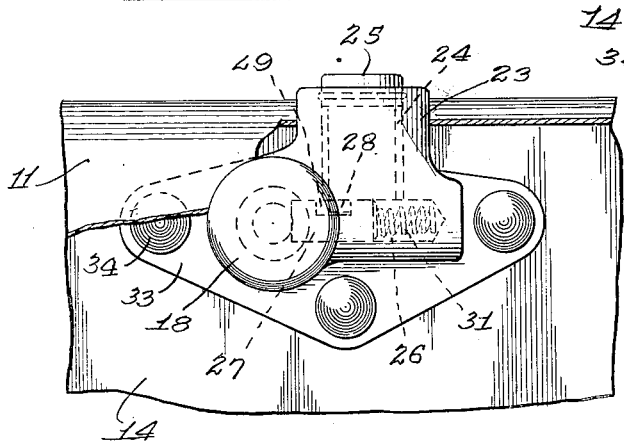
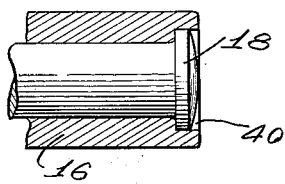
Inventor
Clarence M. Ellenberger.
by Charles Hill
Attys.

Patented May 9, 1933

1,907,525

UNITED STATES PATENT OFFICE

CLARENCE M. ELLENBERGER, OF DETROIT, MICHIGAN, ASSIGNOR TO OAKES PRODUCTS CORPORATION, OF NORTH CHICAGO, ILLINOIS, A CORPORATION OF MICHIGAN

FENDERWELL LOCK

Application filed June 20, 1931. Serial No. 545,673.

This invention relates to improved locking means and arrangement for locking spare wheels or tires against theft from supporting wells in the fenders of automotive vehicles.

The invention relates particularly to the type of locking means comprising a bar extending transversely of the well in position, the lower part of the spare wheel or tire to be locked in the well. At the present time, the trend is toward deeper wells in order to keep the wheels or tires lower on the vehicle, and the general object of the invention is to so arrange the locking means that the locking bar may be supported low enough to be in position just above the lower part of the spare wheel or tire to prevent vertical displacement thereof.

In accordance with my invention, the supporting members or fittings for the locking bar are located at the opposite sides of the well below the fender wall along side of the well, which arrangement will bring the locking bar down low enough relative to the spare wheel or tire, will also remove the fittings from the top of the fender where they might form obstructions and where they could be more readily tampered with.

The various features of improvement which my invention involves are incorporated in the structure disclosed on the accompanying drawing, in which drawing:

Figure 1 is a vertical section through a fender well and a spare wheel supported therein with the locking means applied;

Figure 2 is a plan view of the locking bar and one side of the fender showing the locking fitting which is partly in section;

Figure 3 is an enlarged side view of part of the fender with the locking means in end elevation;

Figure 4 is an end elevation of a modified form of locking bar and lock housing in vertical section.

The fender structure 10 shown is of the usual construction having along its outer side the depending roll or skirt 11.

The fender is cut out to leave an opening 12 and the metal adjacent the opening is deflected downwardly to form the supporting flange 13 to which the fender well body 14 is secured by welding or otherwise to be suspended below the opening 12 for the reception of a spare wheel or spare tire in the usual manner. I have shown a spare wheel W supported in the well.

The locking means comprises a locking bolt or bar 15 and the supporting fittings 16 and 17 therefor. The bolt shown is cylindrical and has the head 18 at its outer end.

The fitting 16 has the cylindrical bore 19 extending therethrough, through which the bolt is inserted to extend transversely of the well, the outer and inner sides of the well having the registering passageways 20 and 21 for receiving the bolt, the inner end of the bolt projecting into the fitting 17.

Inwardly of its head 18, the bolt has the circumferential channel 22 and at one side of the bore 19 the fitting has the vertical extension 23 which has the cylindrical bore 24 forming a pocket for a lock barrel or cylinder 25, the bolt channel 22 being in alignment with the pocket 24 when the bolt is inserted in the fitting 16. At the bottom of the pocket 24 the fitting 16 has the transverse guideway 26 for a lock detent 27 adapted to be projected into the locking channel 22 of the bolt to lock the bolt against axial movement after it has been inserted in locking position across the fender well. The lock cylinder 25 has the eccentric projection 28 extending into the cross notch 29 in the lock detent so that when the lock cylinder is turned by a suitable key inserted in the key hole 30 the lock detent will be axially shifted into or out of the bolt locking channel 22. If desired a spring 31 may be inserted in the guideway 26 behind the lock detent to normally hold the detent in projected position, the key being then used only for turning the lock cylinder to retract the bolt. The end of the lock detent is bevelled as shown in Figure 2 so that when the bolt 15 is inserted through the fitting 16 the detent will be forced in until the locking channel 22 in the bolt comes at register with the guideway 26 whereupon the spring will automatically shift the detent to engage in the channel 22 to then lock the bolt against removal. Where the detent is in locking position in the channel 22 the bolt head 18 will be in engagement with the outer side of the fitting 16 and the bolt is then locked against axial movement in either direction.

The fitting 16 is in greater part below the fender skirt 11, the skirt having the opening 32 therethrough through which the bolt receiving part and the lock supporting extension 23 may project for access to the bolt and to the lock cylinder. At its inner end the fitting 16 has the flange 33 by means of which the fitting is seated against and secured to the outer wall of the fender well, the securing being accomplished by welding, or by means of rivets 34 shown.

A guard shutter 35 may be pivoted on the lock cylinder to close the key hole against the weather when the key is withdrawn.

The fitting 17 may be in the form of a cylindrical sheet metal cup having a flange 36 by means of which it may be secured against the outer side of the inner wall of the well 14 as by spot welding or by means of rivets. A coil or abutment spring 37 is provided in the outer end of the fitting 17 and the spring is of such axial length that when the locking bolt 15 is applied and locked in the housing 16, its outer end will engage with and compress the spring so that the bolt will be held against axial displacement and rattling during travel of the vehicle. The spring also serves the purpose of shifting the locking bolt a distance outwardly when the key has been turned in the lock to release the detent 27 from the bolt, and after such preliminary outward shift of the bolt its head may be grasped and the bolt readily withdrawn from the fender for removal of the spare tire or wheel. The end of the bolt may be tapered as shown in order that it may be more readily guided through the various openings into locking position. Rearwardly of its flange 36 the fitting 17 may be expanded to form a pocket for a packing washer 39 which will prevent transverse displacement or rattling of the locking bolt when in locking position.

As shown in Figure 1, the locking bolt 15 is in locking position over the lower part of the rim of the spare wheel W. To remove the bolt the key is inserted in the lock cylinder and the cylinder is turned to withdraw the locking detent 27 from the locking channel 22, and then the spring 37 will shift the bolt a distance outwardly so that its head 18 will be free to be grasped for the entire removal of the bolt from the well.

When a spare wheel or tire is placed in the well to be locked therein, the bolt 15 is inserted through the housing 16 and across the well and into the fitting 17, the final movement being against the compression of the spring 37, and when the bolt locking channel 22 is in register with the detent 27 the detent will be forced into the channel by the spring 31 and, the bolt head being then against the outer end of the fitting 16, the bolt will be rigidly locked against axial displacement. If a spring 31 is not provided, the detent will be positively moved into the channel 22 by turning of the lock cylinder with the key.

By placing the fitting 16 and 17 below the top wall of the fender leaves the fender top free of obstruction and gives a neat appearance. The fittings are also protected from the weather by the overhanging fender and also cannot very readily be tampered with and forcibly broken away.

Figure 4 shows a modified arrangement in which the end of the fitting 16 has the counter-bore 40 in which the head 18 of the bolt is received when the bolt is shifted into locking position, the bolt head being thus guarded against the application of tools or other devices for the purpose of unlawfuly withdrawing the bolt.

I have shown a practical and efficient embodiment of the features of my invention but I do not desire to be limited to the exact construction and arrangement shown as changes and modification may be made without departing from the scope and principles of the invention as defined by the appended claims.

I claim as my invention:

1. In combination with a fender having an opening and a frame depending therefrom forming a well for receiving a spare wheel or tire, a locking bolt, a fitting rigidly secured outside the outer wall of said well and below the skirt of the fender and having a bore therethrough through which said bolt may be slid to extend transversely of the well over the lower part of a spare wheel or tire to be locked in the well, a vertical lock housing adjacent to the fitting bore, said bolt having a locking notch, a detent movable at the bottom of said lock housing for coacting with said notch to lock the bolt against sliding movement, and a lock in said housing for operating said detent, the fender skirt having an opening through which the outer end of the fitting and the top of the lock housing projects for access to the bolt and lock.

2. In combination with a fender having an opening and a frame depending therefrom forming a well for receiving a spare wheel or tire, a locking bolt, the front wall of said well having an opening therethrough, a fitting secured to the fender front wall and having a horizontal bore therethrough in alignment with said opening through which bore and opening the bolt may be projected to extend transversely of said well below the top thereof and above the lower part of a wheel or tire seated in the well, the bolt end within the fitting bore having a locking notch, a vertical extension on said fitting and key controlled lock mechanism within said extension adapted for interlocking engagement with the locking notch of the bolt to lock said bolt against axial movement, the fender skirt having an opening through which the front end of said fitting projects and having also an opening through which the lock receiving extension projects whereby said bolt and lock means are accessible respectively from the front and top of the fender skirt.

3. In combination with a fender having an opening and a frame depending therefrom forming a well for receiving a spare wheel or tire, a locking bolt, said well having a hole in its front wall beow the skirt of the fender and a fitting secured to said wall and having a horizontal bore in alignment with said hole whereby said bolt may be projected through said bore and hole to extend transversely of said well below the top thereof and above the lower part of a wheel or tire seated in said well, said fitting having a vertical bore, lock mechanism in said vertical bore, means controlled by said lock mechanism for interlocking said fitting and bolt to hold the bolt against axial movement, said fender skirt having front and top openings through which access may be had to said bolt and lock mechanism respectively.

In testimony whereof I have hereunto subscribed my name at North Chicago, Lake County, Illinois.

CLARENCE M. ELLENBERGER.